United States Patent [19]

Ikemura et al.

[11] Patent Number: 4,617,805
[45] Date of Patent: Oct. 21, 1986

[54] AIR CONDITIONER SYSTEM FOR BUILDING

[75] Inventors: Akio Ikemura, Kurobe; Minoru Kajiki, Toyama, both of Japan

[73] Assignee: Yoshida Kogyo K. K., Tokyo, Japan

[21] Appl. No.: 790,948

[22] Filed: Oct. 24, 1985

[30] Foreign Application Priority Data

Nov. 13, 1984 [JP] Japan ............... 59-172041[U]

[51] Int. Cl.⁴ ............................................. F25D 23/12
[52] U.S. Cl. ...................................... 62/259.1; 62/262; 62/263; 62/427; 98/31.6; 98/34.6; 165/53
[58] Field of Search ............. 62/262, 263, 440, 259.1, 62/452, 427; 98/31.6, 34.6; 165/53, 56

[56] References Cited

U.S. PATENT DOCUMENTS

| | | | |
|---|---|---|---|
| 2,116,873 | 5/1938 | Williams | 98/31.6 X |
| 2,295,983 | 9/1942 | Williams | 62/259.1 X |
| 2,306,034 | 12/1942 | Bernhardt | 98/34.6 |
| 2,319,703 | 5/1943 | Olson | 98/31.6 |
| 2,680,354 | 6/1954 | Gygax | 62/427 X |
| 2,722,107 | 11/1955 | Gay | 62/259.1 X |
| 3,313,122 | 4/1967 | Laing | 62/263 |
| 3,354,946 | 11/1967 | Dean, Jr. | 98/34.6 X |
| 3,465,539 | 9/1969 | Smith | 62/427 X |
| 4,307,776 | 12/1981 | Grun et al. | 62/259.1 X |
| 4,505,328 | 3/1985 | Schmitt | 62/263 X |

FOREIGN PATENT DOCUMENTS 59-74443 4/1984 Japan.

*Primary Examiner*—Lloyd L. King
*Attorney, Agent, or Firm*—Hill, Van Santen, Steadman & Simpson

[57] ABSTRACT

An air conditioner system in a building comprising a heat exchanger unit disposed below a building floor, a pair of juxtaposed air passages disposed within a hollow sill in heat exchange relationship to an internal conduit for a heat transferring medium and communicating with the outside air through the heat exchanger unit, a fresh air outlet defined in a top wall of the sill and communicating with the heat exchanger unit through one of the air passages, and a room air inlet defined in a side wall of the sill and communicating with the heat exchanger unit through the other air passage. The air conditioner system thus constructed is sightly to view and provides an air circulation for better air conditioning effects and a uniform air temperature distribution in a house interior space.

8 Claims, 5 Drawing Figures

AIR CONDITIONER SYSTEM FOR BUILDING

BACKGROUND OF THE INVENTION

1. Field of the Invention

This invention relates to an air conditioner system for buildings which is capable of effecting a heat exchange with ventilation.

2. Prior Art

There are known various building air conditioner systems which comprise a pair of passageways defined within a window frame so that fresh air, as it flows through one of the passages, is subjected to a heat exchange relation with a heat transferring medium, such as hot water or cold water flowing through the other passageway. The fresh air thus heated or cooled is discharged into an interior space or room through outlets defined in the window frame.

One known building air conditioner system is disclosed in Japanese Patent laid-open Publication (Kokai) No. 59-74443 published on Apr. 26, 1984. According to the disclosed air conditioner system, a ventilator with a built-in heat exchanger is supported by a window frame between a header or a sill and a transom for effecting ventilation with heat exchange. The ventilator thus attached is exposed to an interior space or room and hence is unsightly to view. It may be too noisy, collects dust, and interferes with activities of occupants of the room. Furthermore, since fresh air is introduced into the room through outlets defined in the transom, it is difficult to create an air circulation in an area disposed below the transom. As a result, a uniform air circulation in the room and a uniform room temperature distribution is difficult to achieve.

SUMMARY OF THE INVENTION

It is a general object of the present invention to provide an air conditioner system for buildings which has structural features capable of overcoming the foregoing drawbacks of the known air conditioner systems.

A more specific object of the present invention is to provide a building air conditioner system which is sightly in appearance and capable of providing an air circulation in a room for better air conditioning effects and a uniform room temperature distribution.

According to the present invention, an air conditioner system for a building comprises a heat exchanger unit disposed below a building floor, a pair of juxtaposed air passages disposed within a hollow sill in heat exchange relationship to an internal conduit for a heat transferring medium and communicating with the outside air through the heat exchanger unit, a fresh air outlet defined in a top wall of the sill and communicating with the heat exchanger unit through one of the air passages, and a room air inlet defined in an inner side wall of the sill and communicating with the heat exchanger unit through the other air passage.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

Figure 1:
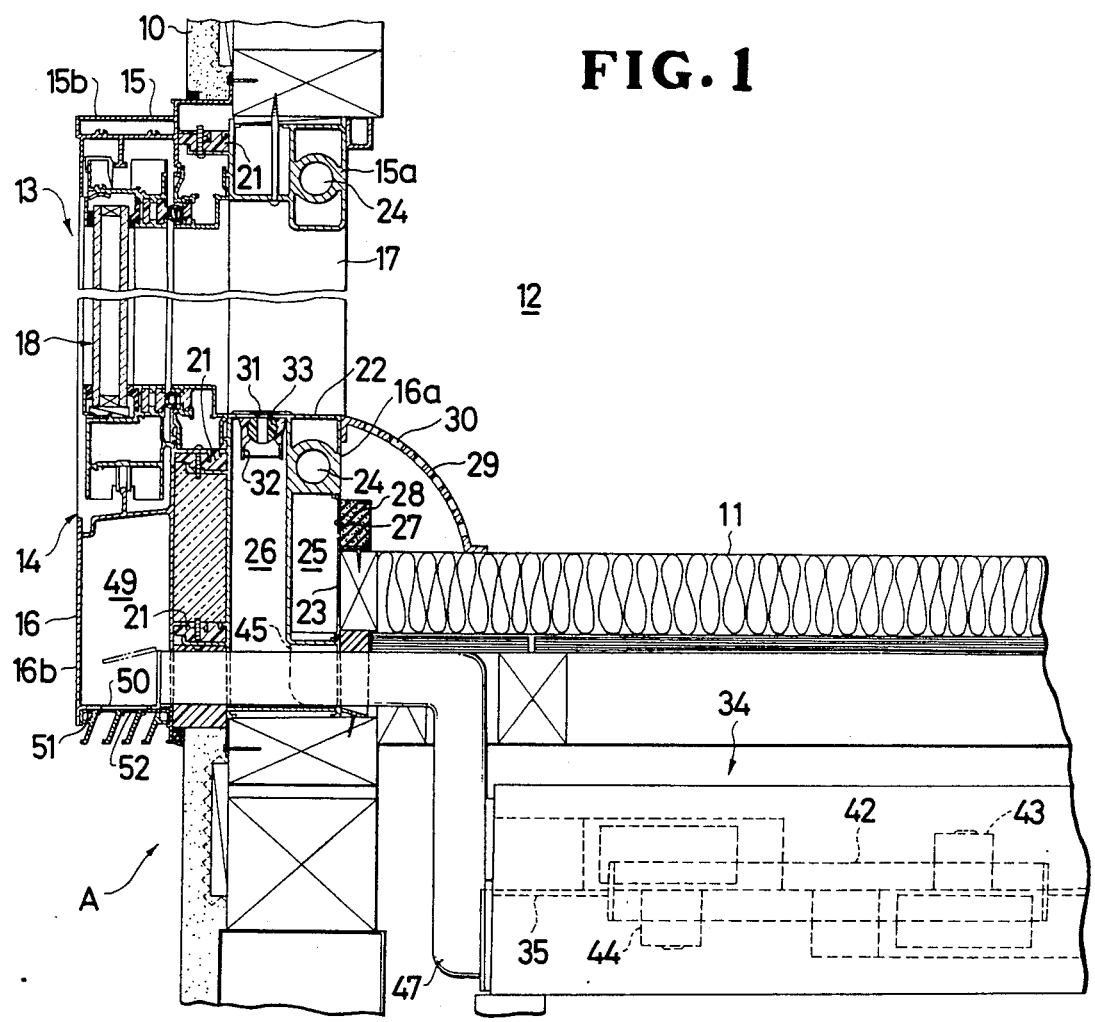
FIG. 1 is a fragmentary vertical cross-sectional view of a building incorporating an air conditioner system according to the present invention.
Figure 2:
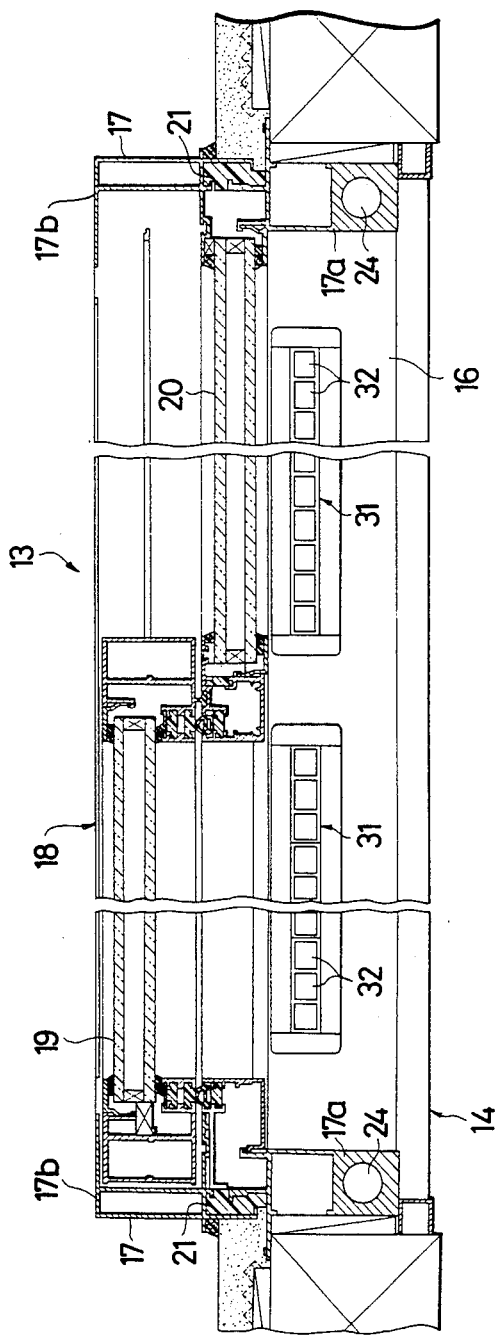
FIG. 2 is a fragmentary horizontal cross-sectional view of a window of the building shown in FIG. 1.

As shown in FIG. 1, an air conditioner system A according to the present invention is employed in a building or house including a wall 10 and a floor 11 which define a part of a house interior space or room 12. The wall 10 includes a rectangular window opening (not designated) within which is mounted a window 13. The window 13 constitutes a part of the air conditioner system A and comprises a rectangular window frame assembly 14 composed of a header 15, a sill 16 and a pair of side jambs 17, 17 that are connected together by suitable fasteners (not shown). The window 13 includes a window unit 18 supported by the frame assembly 14. As shown in FIG. 2, the window unit 18 comprises a sliding window unit including a double glazed slidable window sash 19 and a double glazed fixed window sash 20.

Each of the header 15, the sill 16 and the side jambs 17, 17 has a thermally insulated construction and is composed of an interior frame member 15a, 16a, 17a, 17a and an exterior frame member 15b, 16b, 17b, 17b connected together with connectors 21 interposed therebetween. The frame members 15a–17a, 15b–17b are substantially hollow-shaped and made of an extruded aluminum section whereas the connectors 21 are made of a thermally insulative material such as synthetic resin.

The interior frame member 16a of the sill 16, as shown in FIG. 1, has a top wall 22 and an inner side wall 23 both facing the room 12, the top wall 22 extending above the plane of the floor 11. The interior frame member 16a has an internal conduit 24 of a circular cross section extending longitudinally therethrough for the passage of a heat transfer medium such as hot water or cold water for heating or cooling the room 12, the conduit 24 being located adjacent to a corner defined by the top wall 22 and the inner side wall 23 of the frame member 16a. The interior frame member 16a also has a pair of horizontaly juxtaposed internal air passages 25, 26 extending along the conduit 24. The inner air passage 25 underlies the conduit 24 so that the conduit 24 and the inner and outer air passages 25, 26 are disposed in heat exchange relation to one another, thereby providing an increased heat exchanging efficiency. The header 15 and the side jambs 17, 17 also have internal conduits 24 defined within the respective inner frame members 15a, 17a, 17a for the passage of the heat transferring medium.

Figure 4:
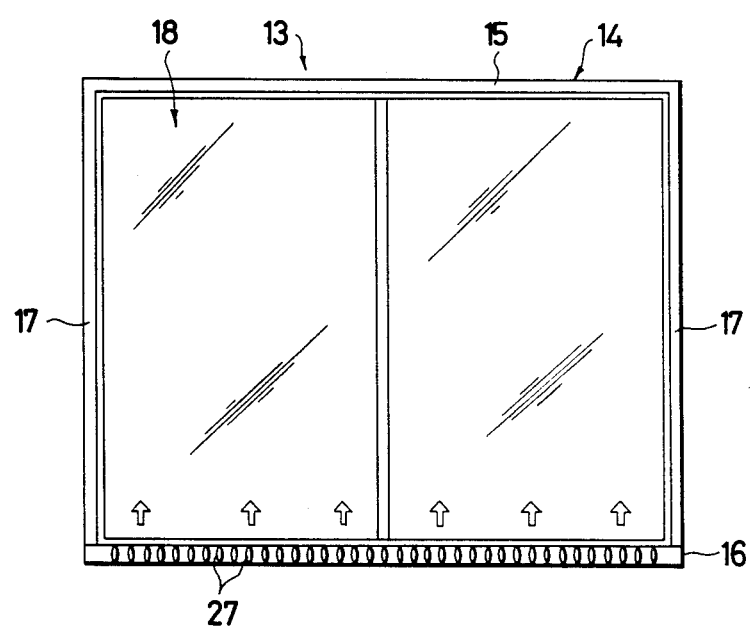
FIG. 4 is a front elevational view, on reduced scale, of the window as seen from the interior side thereof.

The inner side wall 23 of the frame member 16a has a plurality of air inlets 27 (FIG. 4) disposed along the length of the sill 16 at equal intervals for communication between the inner air passage 25 and the room 12. An elongated filter element 28 is disposed flatwise against the inner side wall 23 to cover the air inlets 27. The filter element 28 preferably is made of an open-cell material such as open cell foam rubber and is removably attached to the inner side wall 23. The filter element 28 is covered by a perforated corner cap or cover 29 disposed at the corner which is defined by the floor 11 and the sill 16. The cover 29 has an arcuate cross section and includes a number of small apertures 30. The outer air passage 26 communicates with the room 12 through a plurality of air outlets 31 defined in the top wall 22 of the inner frame member 16a, the air outlets 31 being disposed along the length of the sill 16 in the form of two laterally aligned elongated slots, as shown in FIG. 2. A series of valves 32 is mounted in each of the elongated air outlets 31 for controlling the amount and direction of fresh air discharged from the air outlets 31 into the room 12. As shown in FIG. 1, each of the control valves 32 has a hollow cylindrical shape including a diametrical through-hole in which a cylindrical valve element 33 is rotatably mounted, the valve element 33 having a diametrical through-hole. With the control valve 32 thus constructed, the amount and direction of air discharged from the outlets 31 change as the valve element 33 is turned about its own axis.

Figure 3:
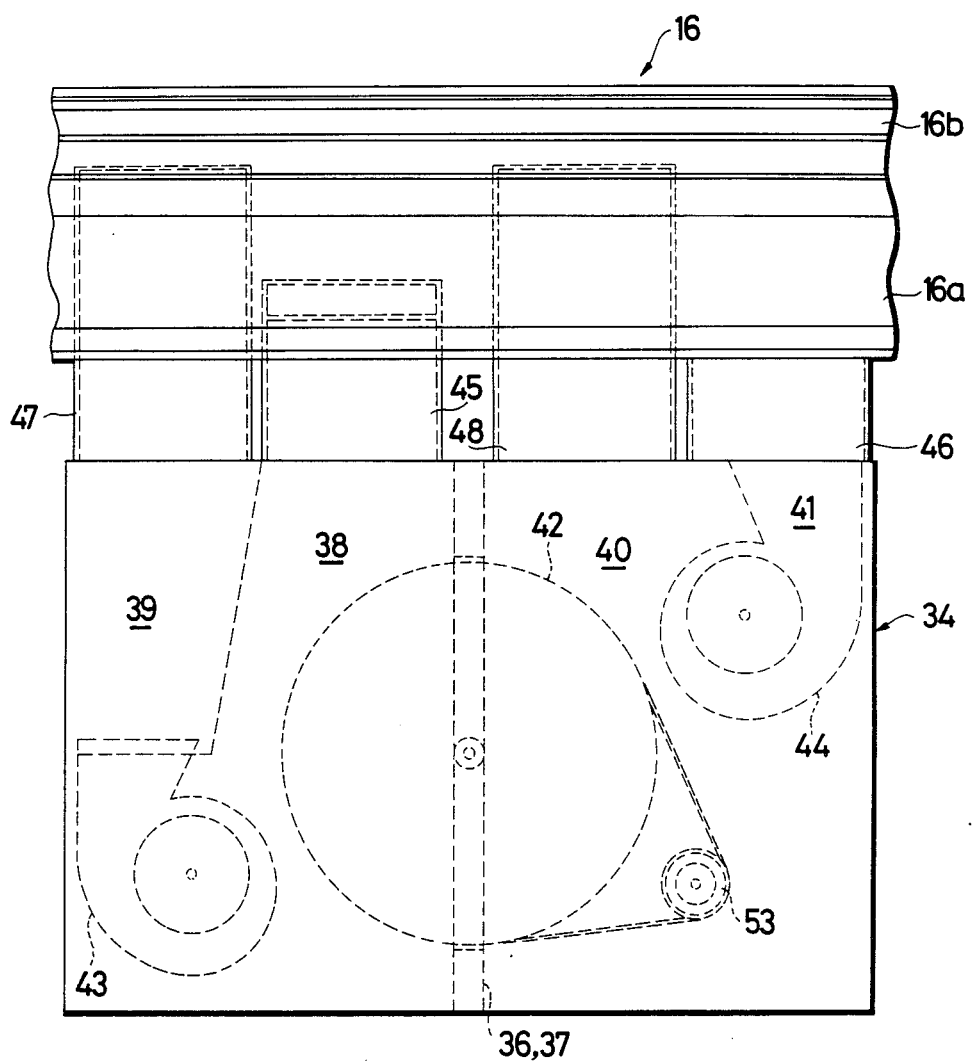
FIG. 3 is a fragmentary plan view of the building of FIG. 1, showing a heat exchanger unit of the air conditioner system and its related parts.

A heat exchanger unit 34 constitutes a part of the air conditioner system A and is disposed below the floor 12. As shown in FIG. 3, the heat exchanger unit 34 has an interior space divided by a central partition 35 (FIG. 1) and a pair of inner and outer partitions 36, 37 into a room air intake chamber 38, a room air discharge chamber 39, a fresh air intake chamber 40 and a fresh air discharge chamber 41. A heat exchange element or rotor 42 is rotatably disposed substantially centrally in the central partition 35 between the inner and outer partitions 36, 37, the heat exchange rotor 42 facing all of the chambers 38 through 41. The heat exchanger unit 34 also has a discharge fan 43 mounted on the central partition 35 for forcing room air to flow from the room air intake chamber 38 to the room air discharge chamber 39 through the heat exchange rotor 42. Likewise, a supply fan 44 is mounted on the central partition 35 for air-flow communication between the fresh air intake chamber 40 and the fresh air discharge chamber 41 through the rotor 42.

The inner and outer air passages 25, 26 are connected to the heat exchanger unit 34, respectively, by a pair of intake and supply pipes or ducts 45, 46. More specifically, the inner air passage 25 communicates with the room air intake chamber 38 through the intake duct 45 while the outer air passage 26 communicates with the fresh air discharge chamber 41 through the supply duct 46. The room air discharge chamber 39 communicates with the outside air through a discharge pipe or duct 47. The fresh air intake chamber 40 communicates with the outside air through an intake pipe or duct 48. The ducts 47, 48 extend from the heat exchanger unit 34 to the outer frame member 16b of the sill 16 transversely across the outer air passage 26 in the inner frame member 16a, the ducts 47, 48 opening into a hollow interior space 49 in the outer frame member 16b. The outer frame member 16b has a set of discharge openings 50 and an intake opening (not shown) defined in a bottom wall 51 of the frame member 16b and disposed respectively adjacent to the ducts 47, 48. The openings 50 are covered by a net screen 52 so as to prevent intrusion of foreign matter into the heat exchanger unit 34 through the ducts 47, 48. The ducts 45 through 48 also constitute a part of the air conditioner system A of the present invention.

Figure 5:
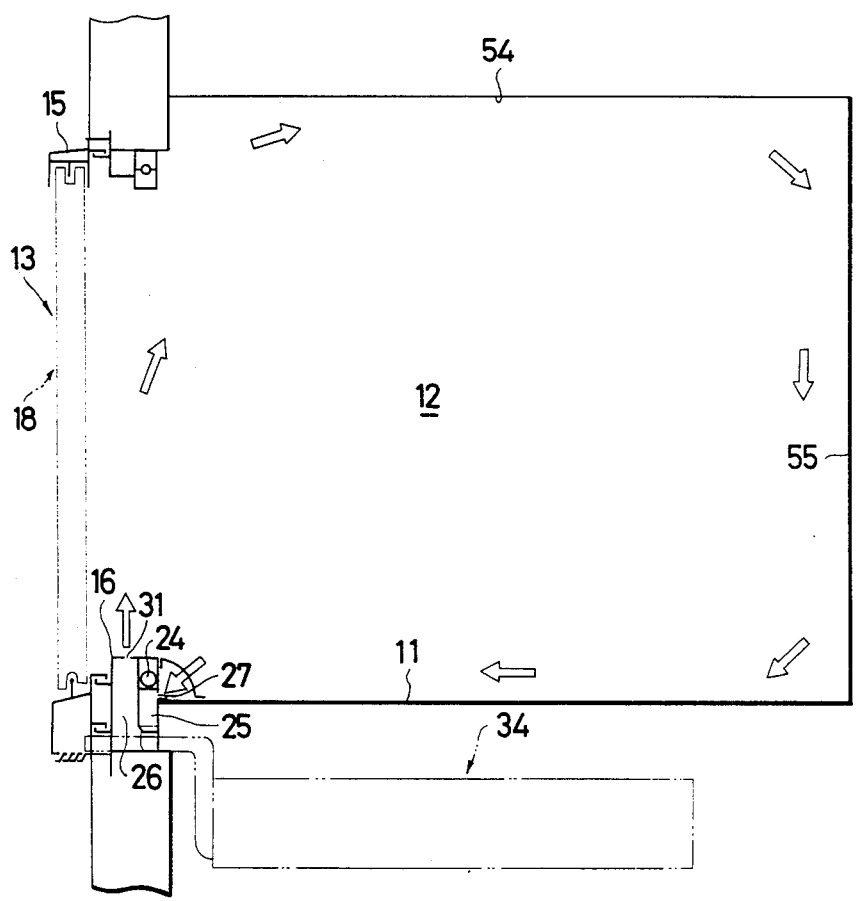
FIG. 5 is a diagrammatical view illustrating an air circulation in a room provided by the air conditioner system shown in FIG. 1.

Operation of the air conditioner system A is as follows: When the house interior space or the room 12 is warmed, hot water is circulated through the conduits 24 of the inner frame members 15a, 16a, 17a, 17a of the window frame assembly 14. The heat exchange rotor 42 is rotated slowly by a motor 53 (FIG. 3) and the discharge and supply fans 43, 44 are driven by respective motors (not designated). Fresh air from the exterior side of the window 13 flows through the intake duct 48, the fresh air intake chamber 40, the heat exchange rotor 42, the fresh air discharge chamber 41, the supply fan 44, the supply duct 46, the outer air passage 26, the control valve 32, and the air outlets 31 into the house interior space 12. As shown in FIG. 5, the discharged fresh air is circulated in the house interior space 12 in a direction indicated by the arrows. More specifically, the fresh air flows upwardly along the window 13 until it impinges against a ceiling 54 where the fresh air is deflected to flow along the ceiling 54 toward a wall 55 which faces to the window 13. Then, the fresh air flows downwardly along the wall 55 toward the floor 11 where it is deflected again to flow along the floor toward the window 13. This air circulation provide better air conditioning effects and a uniform room temperature distribution. At the same time, air from the house interior space 12 flows through the apertures 30 in the cover 29, the filter element 28, the air inlets 27, the inner air passage 25, the intake duct 45, the room air intake chamber 38, the heat exchange rotor 42, the room air discharge chamber 39, and the discharge duct 47 into the outside air.

While the airflows from the interior and exterior sides pass through the heat exchange rotor 42, heat in the form of sensible heat and latent heat is transferred between the airflows. Furthermore, both fresh air and room air, as they flow through the respective air passages 26, 25, receive heat from the heat transfer medium or hot water flowing through the conduit 24. With this construction, the thermal efficiency of the air conditioner system A is improved as a whole.

When the house interior space 12 is cooled, cold water is circulated through the conduits 24 of the interior frame members 15a, 16a, 17a, 17a. The heat exchange takes place between fresh air and room air as they pass through the heat exchange rotor 42. Further, the fresh air and the room air are subjected to a heat exchange relation to cold water as they flow through the respective air passages 26, 25.

Although various minor modifications may be suggested by those versed in the art, it should be understood that we wish to embody within the scope of the patent warranted hereon, all such embodiments as reasonably and properly come within the scope of our contribution to the art.

What is claimed is:

1. An air conditioner system in a building having a wall and a floor defining surfaces of a house interior space, comprising:
  (a) a heat exchanger unit disposed below the floor and having a heat exchange element disposed therein, a room air intake chamber, a room air discharge chamber communicating with said room air intake chamber through said heat exchange element, a fresh air intake chamber and a fresh air discharge chamber communicating with said fresh air intake chamber through said heat exchange element;

(b) a window disposed in the wall and including a rectangular window frame assembly having a substantially hollow sill, said sill having an internal conduit for the passage of a heat transferring medium and a pair of juxtaposed internal air passages extending along said conduit, and further having a side wall and a top wall both facing the house interior space, said side wall having at least one air inlet for communicating between one of said air passages and the house interior space, said top wall having at least one air outlet for communicating between the other air passage and the house interior space; and (c) a first duct communicating through said one air passage with said room air intake chamber, a second duct communicating through said other air passage with said fresh air discharge chamber, a third duct communicating through said room air discharge chamber with the outside air, and a fourth duct communicating through said fresh air intake chamber with the outside air.

2. An air conditioner system according to claim 1, said conduit being disposed adjacent to a corner defined by said side wall and said top wall of said hollow sill, said air passages being disposed in heat exchange relation to said conduit.

3. An air conditioner system according to claim 1, including a filter element disposed on said side wall and covering said air inlet.

4. An air conditioner system according to claim 3, said filter element being made of an open-cell material.

5. An air conditioner system according to claim 4, said open-cell material comprising open cell foam rubber.

6. An air conditioner system according to claim 3, further including a perforated cover covering said filter element.

7. An air conditioner system according to claim 6, said cover having an arcuate cross section and disposed at a corner defined by said hollow sill and the floor.

8. An air conditioner system according to claim 1, said sill comprising a pair of inner and outer frame members connected together with thermally insulative connectors interposed therebetween, said inner frame member having defined therein said conduit and said air passages, said outer frame member having a hollow interior space and a pair of openings through which said hollow interior space communicates with the outside air, said third and fourth ducts extending from said heat exchanger unit transversely across said inner frame member to said outer frame member and opening into the hollow interior space in the outer frame member.

* * * * *